United States Patent [19]

Pounds et al.

[11] Patent Number: 5,462,721

[45] Date of Patent: Oct. 31, 1995

[54] HYDROGEN SULFIDE SCAVENGING PROCESS

[75] Inventors: Russell Pounds, Richmond; Doyle Cherry, Kemah, both of Tex.

[73] Assignee: Crescent Holdings Limited, Kemah, Tex.

[21] Appl. No.: 350,635

[22] Filed: Dec. 7, 1994

Related U.S. Application Data

[63] Continuation-in-part of Ser. No. 295,270, Aug. 24, 1994, abandoned.

[51] Int. Cl.$^6$ .................. B01D 53/48; B01D 53/52; C10G 29/20
[52] U.S. Cl. .................. 423/226; 423/228; 423/229; 423/242.2; 423/242.7; 208/207; 208/236; 208/237; 210/749
[58] Field of Search .................. 423/226, 228, 423/229, 242.2, 242.7; 44/415, 432, 433; 208/189, 207, 208, 236, 237; 252/189, 190, 192; 210/749

[56] References Cited

U.S. PATENT DOCUMENTS

| | | | |
|---|---|---|---|
| 2,731,393 | 1/1956 | Arundale et al. | 208/236 |
| 4,595,723 | 6/1986 | Henson et al. | 524/398 |
| 4,639,478 | 1/1987 | Haas et al. | 524/497 |
| 4,963,352 | 10/1990 | Roberts | 424/73 |
| 4,978,512 | 12/1990 | Dillon | 423/226 |
| 5,066,804 | 11/1991 | Su | 544/173 |
| 5,074,991 | 12/1991 | Weers | 208/236 |
| 5,128,049 | 7/1992 | Gatlin | 210/752 |
| 5,158,778 | 10/1992 | Donovan et al. | 252/109 |
| 5,169,411 | 12/1992 | Weers | 44/421 |
| 5,190,640 | 3/1993 | Roof et al. | 208/189 |
| 5,225,103 | 7/1993 | Hoffmann et al. | 423/226 |
| 5,266,185 | 11/1993 | Weers et al. | 208/47 |
| 5,284,576 | 2/1994 | Weers et al. | 208/236 |
| 5,314,672 | 5/1994 | Vasil | 423/228 |
| 5,347,003 | 9/1994 | Trauffer et al. | 423/226 |
| 5,347,004 | 9/1994 | Rivers et al. | 544/180 |
| 5,354,453 | 10/1994 | Bhatia | 208/236 |
| 5,356,458 | 10/1994 | Javadi et al. | 95/13 |

FOREIGN PATENT DOCUMENTS

| | | | |
|---|---|---|---|
| 0411745A1 | 2/1991 | European Pat. Off. | 423/228 |
| 9201481 | 2/1992 | WIPO | 423/228 |
| 9301126 | 1/1993 | WIPO | 423/228 |

*Primary Examiner*—Ferris Lander
*Assistant Examiner*—Peter T. DiMauro
*Attorney, Agent, or Firm*—Jeffrey L. Streets

[57] ABSTRACT

The levels of hydrogen sulfide and organic sulfides present in gaseous or liquid hydrocarbon streams or mixtures thereof are reduced by contacting the streams with a composition comprising the reaction product of aminoethylpiperazine, an alkanolamine, an etheramine, a polyalkyleneamine, or a polyoxyalkyleneamine with a C1 to C4 aldehyde, including monoaldehydes and dialdehydes, such as ethandial. The solubility of polyamine/aldehyde reaction products is increased by the presence of an enchancing amine/aldehyde reaction product. The enhancing amines include alkanolamines, etheramines, and mixtures thereof.

11 Claims, No Drawings

HYDROGEN SULFIDE SCAVENGING PROCESS

REFERENCE TO RELATED APPLICATION

This application is a continuation-in-part application of U.S. patent application Ser. No. 08/295,270, filed Aug. 24, 1994, now abandoned.

FIELD OF THE INVENTION

The present invention relates to methods and compositions for sweetening hydrocarbons or aqueous systems. More particularly, the invention relates to methods and compositions for selectively reducing the levels of hydrogen sulfide and organic sulfides present in gaseous or liquid hydrocarbon streams, aqueous systems, or mixtures thereof.

BACKGROUND OF THE DISCLOSURE

Natural gas is a naturally occurring mixture of hydrocarbon and non-hydrocarbon gases found in geologic formation beneath the earth's surface, often in association with petroleum. As obtained from oil and gas wells, raw or sour natural gas contains a number of impurities which must be removed before being introduced into a pipeline. The principal impurities in natural gas are water, carbon dioxide, and hydrogen sulfide. These undesirable components are conventionally removed from raw natural gas streams in gas processing plants. The processing plants are normally located in the field and vary in size from small units to large, centrally located plants.

Hydrogen sulfide is malodorous, poisonous and, when burned, the major cause of acid rain. When gaseous or liquid fuels containing hydrogen sulfide are burned, sulfur dioxide and water are formed. Acid rain is essentially an aqueous solution containing $SO_2$, $SO_2*6H_2O$ and sulfurous acid ($H_2SO_3$).

The composition of raw natural gas varies widely from field to field. For example, the methane content can vary between 45 percent and 96 percent by volume, while the hydrogen sulfide, $H_2S$, content may range from 0.1 parts per million (ppm) to 150,000 ppm.

Since hydrogen sulfide is corrosive in the presence of water and poisonous in very small concentrations, it must be almost completely removed from natural gas streams before use and preferably before transport or processing in oil field equipment, pipelines, and refineries. As a result, many pipeline specifications limit the amount of hydrogen sulfide to less than 0.25 grains per 100 cubic feet of gas. Accordingly, removal of $H_2S$ from hydrocarbons, e.g., natural gas, crude oil, and refined oil products is an important concern. Further, because of the large quantities of hydrocarbon material to be treated, it is important to have a means of removal that is economically efficient.

The technology known in the art for removing hydrogen sulfide from raw natural gas was developed for large processing plants to remove hydrogen sulfide in continuous processes. These large processing plants are fed by one or more natural gas wells, each of which may produce over 10 million cubic feet of natural gas per day. Many of these processes utilize commodity chemicals or proprietary materials to lower the hydrogen sulfide levels in natural gas to pipeline specifications. Also, many of these processes not only sweeten sour natural gas to pipeline specifications, but also regenerate most, if not all, of the sweetening compositions involved.

Complicating the removal problem is the fact that some treatments will have one or more good performance characteristics, but will also have some undesirable performance characteristic(s). For instance, many treatments are difficult to handle because of their viscosity, pour point, tendency to form water emulsions, or toxicity. The solubility of the treatment additive is often of paramount importance. Because of the demanding performance characteristics required of a hydrogen sulfide scavenger, the chemistry available is very limited.

U.S. Pat. No. 2,426,318 discloses a method of inhibiting the corrosive action of natural gas and oil containing soluble sulfides on metals by utilizing certain aldehydes, preferably formaldehyde. Although the aldehydes are effective in selectively reducing the sulfide levels of natural gas, they are known to form trithiane compounds upon reaction with the sulfides. The trithianes are solids which do not easily dissolve and can clog gas lines. Furthermore, aldehydes are unstable, temperature sensitive and have a tendency to polymerize. Moreover, aldehydes are known carcinogens and environmentally hazardous. For these reasons, the use of aldehydes for sweetening natural gas has come into disfavor.

U.S. Pat. No. 4,515,759 discloses a buffered aqueous solution of sodium nitrite which is injected into scrubber towers to sweeten natural gas. This system is not regenerable, limiting its use to batch processes, and produces undesirable solid elemental sulfur.

U.S. Pat. No. 4,978,512 (Dillon) discloses a method for selectively reducing the levels of hydrogen sulfide and organic sulfides from gaseous and/or liquid hydrocarbon streams, particularly natural gas streams, by contacting the streams with the reaction product of an alkanolamine with a monoaldehyde. The patent also discloses that the reaction product may be mixed with a glycol prior to contact with the gas in order to reduce the water levels in the gas.

U.S. Pat. No. 5,128,049 (Gatlin) discloses a method of using triazines as hydrogen sulfide scavengers.

U.S. Pat. No. 5,169,411 (Weers) discloses a method for preventing liberation of $H_2S$ in crude oil or petroleum residuum medium with imines.

U.S. Pat. No. 5,266,185 (Weers) discloses the suppression of hydrogen sulfides in a heavy hydrocarbon derived from heavy crude oil by contacting the petroleum with the reaction product of a heterocyclic aldehyde and an organic primary amine. The useful compound was described as an imine.

U.S. Pat. No. 5,284,576 (Weers) discloses a process for scavenging hydrogen sulfide using a scavenger prepared by reacting an alkylenepolyamine, including diethylenetriamine, and formaldehyde. In Example 1, column 4, lines 10–16, Weers taught that formaldehyde should be added to a flask of diethylenetriamine. However, this reaction results in a gel which is very difficult to handle and makes the product entirely unsuitable for use as a hydrogen sulfide scavenger.

U.S. Pat. No. 5,314,672 (Vasil) discloses a method of selectively reducing the levels of hydrogen sulfide and organic sulfides by contacting natural gas with the reaction product of ethylenediamine and 50% uninhibited aqueous formaldehyde.

Although many compositions of amine-aldehyde condensation products and methods for their use for reducing hydrogen sulfide in hydrocarbon streams have been developed, the problem has not been effectively resolved as evidenced by the number of recently issued patents which disclose alternative methods. Many of the amine-aldehyde compounds which have previously been developed are unstable, or must be added in cost prohibitive amounts to effectively reduce the hydrogen sulfide levels in natural gas.

Various of the above, prior art scavengers contain excess, unreacted formaldehyde. While formaldehyde may act as a hydrogen sulfide scavenger, it forms a compound which is both crystalline and carcinogenic. Therefore, it is highly undesirable to have a scavenger system which contains any free or unreacted formaldehyde.

Despite the above efforts, there remains a need in the art for an efficient and cost effective method and scavenger for selectively reducing the levels of hydrogen sulfide and organic sulfides found in sour hydrocarbon streams and aqueous systems which has reduced toxicity, remains soluble upon reaction with hydrogen sulfide and organic sulfides, and does not form gels during the process of manufacturing the scavenger.

Although this invention concerns hydrogen sulfide "suppression", it is important to understand that no single composition can be certain to economically remove all hazardous levels of hydrogen sulfide under all circumstances. That is, hydrogen sulfide may appear in hazardous concentrations after a treatment that in similar circumstances had successfully suppressed hazardous concentrations. It is important that all potential sources of hydrogen sulfide be monitored and that any suppression means not be relied upon as infallible.

SUMMARY OF THE INVENTION

The present invention provides a composition and method for selectively reducing the levels of hydrogen sulfide and organic sulfides present in a gas, comprising the step of contacting the streams or systems with a composition comprising the reaction product of a dialdehyde preferably ethanedial having two carbonyl groups and an alkanolamine preferably monoethanolamine having at least one active hydrogen and preferably two active hydrogens. The amounts of dialdehyde and alkanolamine used to prepare the reaction products of the present invention may vary between about 0.5 and about 3 equivalents of active hydrogen in the alkanolamine for every equivalent of carbonyl groups in the dialdehyde, but the preferred ratio is about 2. This reaction is carried out below about 150° F. and produces a product that has substantially no solids.

A method for selectively reducing the levels of hydrogen sulfide and organic sulfides present in a gas, a liquid, or mixtures thereof comprising the step of contacting the streams with a composition comprising the reaction product of (i) a blend of amines comprising a first amine and a second amine, wherein the first and second amines are selected from the group consisting of polyamines, etheramines, alkanolamines and mixtures thereof, and (ii) a C1 to C4 aldehyde, or mixtures of aldehydes. The preferred polyamines are selected from the group consisting of aminoethylpiperazine, polyalkyleneamines, polyoxyalkyleneamines, and mixtures thereof. The preferred etheramines are selected from the group consisting of aminoethoxyethanol, methoxyethylamine, methoxypropylamine, and mixtures thereof. The preferred alkanolamines are selected from the group consisting of aminoethylethanolamine, monoethanolamine, isopropanolamine, 2-amino-1-butanol, 2-amino-2-methyl-1-propanol, 2-amino-2-methyl-1,3-propanediol, 2-amino-2-ethyl-1,3-propanediol, tris(hydroxymethyl)aminomethane, and mixtures thereof. The composition may also include a surfactant.

Alternatively, the composition may be the reaction product of a blend of amines comprising a polyamine and an enhancing amine, and a C1 to C4 aldehyde, or mixtures of aldehydes. The enhancing amine is either an alkanolamine, wherein the preferred alkanolamine is selected from the group consisting of aminoethylethanolamine, monoethanolamine, isopropanolamine, 2-amino-1-butanol, 2-amino-2-methyl-1-propanol, 2-amino-2-methyl-1,3-propanediol, 2-amino-2-ethyl-1,3-propanediol, tris(hydroxymethyl)aminomethane, and mixtures thereof, or an etheramine, wherein the preferred etheramine is selected from the group consisting of aminoethoxyethanol, methoxyethylamine, methoxypropylamine, and mixtures thereof. The preferred polyamine is selected from the group consisting of aminoethylpiperazine, polyalkyleneamine, polyoxyalkyleneamines, and mixtures thereof.

The method of the present invention is easy to carry out and is surprisingly effective compared to methods employing other compounds.

DETAILED DESCRIPTION

In this specification and the claims, numerical values are not critical unless otherwise stated. That is, the numerical values may be read as if they were prefaced with the word "about" or "substantially."

The present invention relates to a method and composition of reducing or scavenging hydrogen sulfide and/or organic sulfides in gaseous and/or liquid hydrocarbons and aqueous systems. Many industries are presently concerned with hydrogen sulfide and/or organic sulfides reduction and/or removal in their operations. It is the intention of the inventors that the methods and compositions of the invention be applied to any industry where sulfide reduction or removal is desired.

The following industries, operations and streams are some examples of where this invention is useful for removing or reducing sulfides: (1) The petroleum energy industries, including but not limited to oil field operations, gas plant operations, and refining, may use the invention to scavenge sulfides from produced gas, process gas, crude oil, residual hydrocarbons, liquified petroleum gas, carbon dioxide gas, produced water, waterfloods, waste water disposal, drilling fluids, and vapor space in liquid hydrocarbon storage and shipping containers; (2) The manufacturing industries may use the invention in many applications, including steel plant coke oven gas; (3) Mining operations must often clean their coal seam gas or sour gas in gold, silver, helium, and all other mines where $H_2S$ is a problem or nuisance; (4) The geothermal energy industry may use the invention for water conditioning; (5) Sanitary landfills may have landfill gas that must be sweetened; (6) Municipal and industrial waste water treatment plants may require application of the invention to anaerobic digestor gas, nuisance odor control, and municipal or industrial sludge; and (7) the invention may be used to remove hydrogen sulfide and mercaptans in the pulp and paper mill industry.

The present methods and compositions selectively reduce the levels of hydrogen sulfide, organic sulfides, and potentially other sulfides, present in gases and liquids, such as gaseous hydrocarbon streams, liquid hydrocarbon streams, aqueous systems, acid gases, or mixtures thereof. The method requires contacting the particular stream with a composition which is a reaction product of an active primary or secondary amine with an aldehyde. For purposes of this disclosure, an aldehyde includes both monoaldehydes (one carbonyl group) and dialdehydes (two carbonyl groups).

When a scavenger solution contains excess aldehyde, the aldehyde will also scavenge sulfides. However, certain monoaldehydes, such as formaldehyde, are carcinogenic. In order to avoid having free monoaldehyde in the scavenger solution, the amount of monoaldehyde and amine used to form an amine/monoaldehyde reaction product must be stoichiometrically balanced.

By contrast, dialdehydes, such as ethanedial, have a low order of toxicity and/or carcinogenicity. Therefore, it is not necessary that amine/dialdehyde reaction products be stoichiometrically balanced.

In general, the scavenging compounds of the present invention are prepared by the exothermic reaction of the amines, or blends of amines, with any C1 to C4 aldehydes. The preferred monoaldehydes include, but are not limited to, formaldehyde, acetaldehyde, propionaldehyde (propanal), and n-butyraldehyde (1-butanal). The most preferred monoaldehyde is formaldehyde. The preferred dialdehyde is ethanedial.

All of the scavengers of the present invention may be prepared by reacting the amine and aldehyde in an active-hydrogen:carbonyl-group ratio of between about 0.5 and about 3. However, it is preferred that the reactants be present in the ratio of two equivalents of active hydrogen in the amine for each carbonyl group equivalent in the aldehyde. An active hydrogen is a hydrogen atom bonded directly to a nitrogen atom (NH group). Thus, one mole of a primary amino group ($NH_2$, having two active hydrogens) is capable of reacting with one carbonyl group equivalent, wherein a carbonyl group equivalent may be provided either by one mole of a monoaldehyde or by one-half mole of a dialdehyde. Two moles of a secondary amino group (NH, having one active hydrogen or one NH group) are capable of reacting with one carbonyl group equivalent (CHO group). A tertiary amino group will not react with an aldehyde to form a stable compound when the manufacturing procedures of this invention are followed.

Following the ratio of one carbonyl group equivalent per two equivalents of active hydrogen, the reaction product of the present invention allows for a stoichiometrically balanced hydrogen sulfide scavenger having substantially no free aldehyde. A stoichiometrically balanced reaction is primarily important when using a carcinogenic monoaldehyde, such as formaldehyde. However, monoaldehydes, dialdehydes, or amines may be in excess for use in certain applications.

Furthermore, the aldehydes of the present invention may or may not contain water as their only solvent or may contain water with various amounts of methanol ranging from about 4% to about 15%. Typically, a 50% aqueous solution of formaldehyde does not contain methanol. Likewise, a solution of 40% ethandial contains no methanol.

Methanol and/or water can both be utilized in the scavenger product to reduce the viscosity for use in natural gas applications. In addition, methanol, isopropanol, and ethyleneglycol can be added to the solution to act as an antifreeze, which may be desirable for use in colder climates.

SINGLE AMINE PRODUCTS

The present invention provides certain amine/aldehyde reaction products for scavenging hydrogen sulfide from a gas. Specifically, the inventors have discovered that alkanolamines reacted with dialdehydes produce hydrogen sulfide scavengers which out perform the present industry leading scavenger.

These scavengers may be prepared by reacting the amine and aldehyde in any effective ratio. However, it is preferred that the scavengers of the present invention be prepared by reacting the amine and aldehyde in an active-hydrogen:carbonyl-group ratio of between about 0.5 and about 3. It is most preferred that the active-hydrogen:carbonyl-group be about 2 so that the reaction product is stoichiometrically balanced.

Ethanedial is the preferred dialdehyde for use in preparing the dialdehyde-based scavengers of the present invention. Ethanedial may be obtained and used in any concentration, including anhydrous solutions, but the preferred solution contains about 40% ethanedial in water.

Monoethanolamine is the preferred alkanolamine for use in preparing the dialdehyde-based scavengers of the present invention. Monoethanolamine may be used in any concentration, including anhydrous solutions, but the preferred solution contains about 85% monoethanolamine in water.

The most preferred reaction product is prepared by reacting a stoichiometrically balanced amount of monoethanolamine with ethanedial. This stoichiometrical balance is achieved at a ratio of 2 active hydrogens per carbonyl group. It is preferred that the temperature of this exothermic reaction be maintained below about 150° F. It is most preferred that the temperature of this exothermic reaction be maintained below about 120° F. The exact structure of this reaction product has yet to be determined. Preliminary gas chromatograph, mass spectrograph, and NMR analysis performed on the reaction product has produced no evidence that triazines or imines are present.

The color of the reaction product is effected both by the ratio of reactants and by the temperature of the reaction. At or near a stoichiometrically balanced reaction, occurring below about 120° F., the reaction product will take on a transparent redish yellow tint. When the reaction takes place at temperatures above about 120° F., the product will have a medium redish brown coloration. Within about 15–30 minutes after the product has been exposed to hydrogen sulfide, it will have a black appearance.

Additionally, regardless of the exact active hydrogen:carbonyl ratio, a monoethanolamine/ethanedial reaction product shows less tendency to form solids in a system when reacted with hydrogen sulfide and/or mercaptans than other products presently commercially available.

Another single amine product of the present invention is the reaction product of aminoethylpiperazine and a C1 to C4 aldehyde, including monoaldehydes and dialdehydes. Unlike the monoethanolamine/ethandial reaction, this reaction is not sensitive to the temperature of the exothermic reaction. The preferred aldehydes for reaction with aminoethylpiperazine are the monoaldehydes, of which formaldehyde is the most preferred.

Yet another single amine product of the present invention is the reaction product of etheramines with aldehydes. The preferred aldehyde being ethanedial.

The following example illustrates the hydrogen sulfide scavenging performance of the monoethanolamine/ethandial reaction product compared to an industry-leading scavenger formulation.

EXAMPLE 1

The following product formulations for scavenging $H_2S$ from natural gas were evaluated on Texas Gulf Coast field gas using laboratory scale testing equipment consisting of sparger-equipped clear plastic towers 1.25 inches in diameter by 16 inch in height. The volume of influent field gas was split evenly between the towers and controlled with a flow control meter at four (4) standard cubic feet per hour (scfh) for each individual tower. The $H_2S$ concentration in the influent and effluent gas was measured with a SENSIDYNE/GASTEC pump and $H_2S$ analyzer tubes. (Sensidyne and Gastec are trademarks of Sensidyne, Inc. of Clearwater, Florida). This technique allowed the scavenging performance of the present formulations and available commercial products to be directly compared. The relative performance of the product is seen by comparing the amount of hydrogen sulfide slippage through the tower containing the liquid product.

Products 1, 3, and 4 were prepared by placing the monoethanolamine in a vessel, mixing the ethanedial and methanol together in a separate vessel, then adding the ethanedial/methanol mixture to the monoethanolamine. Product 2 was prepared by adding the monoethanolamine to the ethanedial/methanol mixture. The amounts of ethanedial and monoethanolamine are indicated below.

The field gas that was used in the evaluations had the following composition and properties:

| | |
|---|---|
| Methane | 92.9% |
| Ethane | 0.4% |
| Carbon Dioxide | 2.4% |
| Hydrogen Sulfide | 12,200 ppm |
| Gas pressure | 185 psig |
| Gas temperature | 130° F. |

| Product Formulations (wt %) | | | | |
|---|---|---|---|---|
| Ingredient | Prod. #1 | Prod. #2 | Prod. #3 | Prod. #4 |
| Monoethanolamine | 46.00 | 46.00 | 47.89 | 40.52 |
| Ethanedial (60% $H_2O$) | 49.86 | 49.86 | 48.55 | 55.26 |
| Methanol | 4.13 | 4.13 | 3.56 | 4.22 |

| Product Test Results (ppm $H_2S$ slippage) | | | | | |
|---|---|---|---|---|---|
| Time (min) | Blank | Prod. #1 | Prod. #2 | Prod. #3 | Prod. #4 |
| Start | 11,500* | — | — | — | — |
| 30 | 11,000 | 395 | 360 | 420 | 2000+ |
| 60 | 9,500 | 395 | 400 | 445 | 1,600 |
| 90 | 10,100 | 400 | 390 | 410 | 600 |
| 120 | 10,200 | 400 | 400 | 410 | 600 |
| 150 | 10,100 | 400 | 400 | 400 | 670 |
| 180 | 10,100 | 650 | 650 | 550 | 820 |
| 210 | 10,100 | 1100 | 1000 | 900 | 1,020 |
| 240 | 10,500 | 1750 | 1550 | 1600 | 1,300 |
| 270 | 10,100 | 2520 | 2420 | 2350 | 2,500 |
| 300 | 10,000 | 6500 | 4500 | 4500 | 4,500 |
| 330 | 10,100 | 7300 | 8000 | 6800 | 6,200 |
| 360 | 10,000 | 8800 | 9300 | 8500 | 8,200 |
| 390 | 10,500 | 9800 | 9000 | 8500 | 8,500 |

*This blank was drawn from the wellhead rather than the tower.

EXAMPLE 2

A formulation of the present invention, labeled Product #5, was tested according to procedures of Example 1, above, along with the industry standard hydrogen sulfide scavenger, SULFASCRUB HSW 0700F. The HSW O700F. product of the SULFASCRUB (a trademark of the Petrolite Corporation, St. Louis, Mo.) product line is available from the Petrolite Corporation of St. Louis, Mo.

Product #5 is similar to Product #1 of Example 1. Product #5 was prepared by placing 46.00 wt % of a 85% monoethanolamine solution in a vessel, mixing 50 wt % of a 40% ethanedial solution and 4 wt% of methanol together in a separate vessel, then adding the ethanedial/methanol mixture to the monoethanolamine.

| Product Comparison Results (ppm $H_2S$ slippage) | | | | | |
|---|---|---|---|---|---|
| Time Elapsed (minutes) | Blank | HSW 0700F (ppm $H_2S$ Slippage) | HSW 0700F (% $H_2S$ removal) | Prod. #5 (ppm $H_2S$ Slip) | Prod #5 (% $H_2S$ removal) |
| Start | 11,000 | — | | — | |
| 15 | 10,800 | 225 | 97.9 | 250 | 97.7 |
| 45 | 10,200 | 270 | 97.4 | 330 | 96.8 |
| 60 | 10,200 | 245 | 97.6 | 250 | 97.5 |
| 90 | 10,100 | 340 | 96.6 | 250 | 97.5 |
| 105 | 10,100 | 390 | 96.1 | 310 | 96.9 |
| 120 | 10,000 | 420 | 95.8 | 340 | 96.6 |
| 135 | 10,200 | 490 | 95.2 | 410 | 96.0 |
| 150 | 9,900 | 550 | 94.4 | 470 | 95.3 |
| 165 | 9,900 | 650 | 93.4 | 530 | 94.6 |
| 180 | 10,000 | 790 | 92.1 | 710 | 92.9 |
| 195 | 10,000 | 1025 | 89.8 | 980 | 90.2 |
| 210 | 10,000 | 1300 | 87.0 | 1250 | 87.5 |
| 225 | 10,000 | 2150 | 78.5 | 1600 | 84.0 |
| 240 | 10,000 | 3200 | 68.0 | 2200 | 78.0 |
| 255 | 10,000 | 6000 | 40.0 | 3100 | 69.0 |
| 270 | 10,000 | 7000 | 30.0 | 4250 | 57.5 |
| 285 | 10,000 | 7900 | 21.0 | 5800 | 42.0 |
| 300 | 10,000 | 8200 | 18.0 | 7500 | 25.0 |

In the above example, which was carried out at four (4) standard cubic feet of gas per hour for a period of 300 minutes, the overall absorption efficiency of Product #5 is about 83.2% and the overall absorption efficiency of HSW 0700F is about 77.3%. Based upon the relative hydrogen sulfide slippage given in the table above, the monoethanolamine/ethanedial reaction Product #5 yields an overall absorption efficiency that is significantly more than 6 percent greater that the HSW 0700F. Based upon the continuing absorption capacity of Products #1–4 between 300 and 390 minutes in Example 1, it is believed that the overall absorption capacity of the monoethanolamine/ethanedial reaction product may be as much as 10 percent greater than that of HSW 0700F.

Prior to the test, Product #5 was observed to have a medium brown tint, primarily due to the approximately 145° F. reaction temperature, and a viscosity just slightly greater than water. Immediately upon intitiation of the test, exposing Product #5 to hydrogen sulfide, the color began turning a darker brown until reaching a dark black color within about 30 minutes. Once depleted, the spent Product #5 had a viscosity similar to used automotive oil.

BLENDING OF POLYAMINES

It has been found in the art that the stoichiometrically balanced reaction product of a polyamine and an aldehyde will usually form gels which are unsuitable for use as a hydrogen sulfide scavenger. However, the inventors have found that by first reacting an enhancing amine with an aldehyde, the solubility of a polyamine/aldehyde reaction product is increased. This finding makes it possible and practical to use polyamine/aldehyde reaction products as scavengers. Therefore, when preparing a polyamine/aldehyde reaction product, it is preferred that an enhancing amine be added to the aldehyde either simultaneous with or prior to the addition of the polyamine.

A stoichiometrically balanced reaction product of a polyamine and an aldehyde will typically form gels that are commercially useless. According to the present invention, this limitation may be overcome by using an etheramine/aldehyde or alkanolamine/aldehyde reaction product to increase the solubility of a stoichiometrically balanced polyamine/aldehyde reaction product. While the etheramines and alkanolamines may be of any molecular weight, the preferred etheramines and alkanolamines have molecular weights of less than about 130. Likewise, the polyamines may have greater molecular weights, but the preferred polyamines have molecular weights of less than 240. In this manner, the solubility of the polyamine/aldehyde reaction product can be increased by adding an enhancing amine to the aldehyde either prior to or simultaneously with the addition of the polyamine. This avoids the formation of gels in the manufacturing process and the formation of gelatinous solids by the spent product in the user's systems.

The first group of primary or secondary amines, referred to herein as enhancing amines, have molecular weights ranging between about 60 and about 125. The enhancing amines include alkanolamines, etheramines, and mixtures thereof. The preferred alkanolamines include monoisopropylamine, 2-amino- 1-butanol, 2-amino-2-methyl- 1-propanol, 2-amino-2-methyl- 1,3-propanediol, 2-amino-2-ethyl- 1,3-propanediol, tris(hydroxymethyl)aminomethane, aminoethylethanolamine and monoethanolamine. The most preferred alkanolamines are aminoethylethanolamine and monoethanolamine. The preferred etheramines are aminoethoxyethanol, methoxyethylamine, and methoxypropylamine. The most preferred etheramine is aminoethoxyethanol.

The second group of primary or secondary the amines are the polyamines. Polyamines, as used herein, are defined as organic amines having a plurality of amine groups with two or more of the following: a primary amine group, a secondary amine group, or a tertiary amine group. These polyamines include, but are not limited to, aminoethylpiperazine, polyoxyalkyleneamines, and alkylenepolyamines. The polyoxyalkyleneamines useful in the present invention are defined by the formula $H_2N-(R-O)_n-R-NH_2$, where R is an C1 to C3 alkyl group and n is an integer from 1 to 4. The most preferred polyoxyalkyleneamine is triethyleneglycoldiamine. The alkylenepolyamines are defined by the formula $H_2N-(R-NH)_n-R-NH_2$ where R is an C1 to C3 alkyl group and n is an integer from 1 to 4. The most preferred alkylenepolyamine is ethylenediamine.

When the enhancing amine is added to the aldehyde first, the order of addition of other reactants does not matter. Following this method will avoid the formation of gels and will produce a non-carcinogenic product of acceptable viscosity, if the enhancing amine/polyamine ratio is properly adjusted.

According to the present invention, it is possible to blend an enhancing amine with a polyamine before addition to an aldehyde. In this manner, the amine blend can react with an aldehyde, or mixture of aldehydes, in a single step while assuring that no excess aldehyde is left in the solution. When an alkanolamine or an etheramine is reacted with a monoaldehyde, the reaction product will be substantially a triazine. This is not the case, however, when an alkanolamine or an etheramine is reacted with a dialdehyde.

Alternatively, the polyamine and enhancing amine may be added to an aldehyde, or mixture of aldehydes, sequentially. In this mode, it is necessary that the enhancing amine be added to the aldehyde first to provide sufficient solubility to avoid forming a gel upon addition of polyamine. The polyamine is then added to react with the remaining aldehyde.

Furthermore, the polyamine and enhancing amine may be made to react with substantially different aldehydes, or aldehyde mixtures through a sequential addition of reactants. This may be desirable either to modify the characteristics of the solution or take advantage of price variations. One example of a sequential process begins with a first aldehyde being added to a reaction vessel. Second, an enhancing amine is added in sufficient quantity to react with substantially all of the first aldehyde. Third, a second aldehyde is added to the reaction vessel. Finally, a polyamine is added in sufficient quantity to react with the second aldehydes and any excess of the first aldehyde. This method allows selection of unique polyamine/aldehyde and enhancing amine/aldehyde combinations.

The polyamine/aldehyde and enhancing amine/aldehyde reaction products are each hydrogen sulfide scavengers. However, the polyamine/aldehyde reaction products tend to have a faster reaction rate with hydrogen sulfide and mercaptans than other amine/aldehyde reaction products. Alternately, the enhancing amine/aldehyde reaction product, specifically monoethanolamine/aldehyde, tend to have a greater hydrogen sulfide absorption capacity per unit volume than the polyamine/aldehyde reaction products. Furthermore, tests indicate that a monoethanolamine/dialdehyde reaction product tends to have a hydrogen sulfide absorption capacity that is about 10% greater than that of a monethanolamine/monoaldehyde reaction product. It follows that the preferred amount of enhancing amine should be no more than a sufficient amount to provide the desired solubility to the polyamine/aldehyde reaction product.

While the polyamines and enhancing amines may be present in any concentration or ratio, it is typical that the combination of the polyamine and enhancing amine will comprise between about 20 and about 50 weight percent of the scavenger solution. The enhancing amine, for purposes of increasing the solubility of the polyamine/aldehyde reaction product, may comprise any proportion of the scavenger solution, but will typically comprise between about 5 and about 25 weight percent of the scavenger solution. It should be noted that the relative amounts stated above are recommended to provide a relatively concentrated scavenger solution which may or may not be diluted in the field. On the other hand, a scavenger solution could be more concentrated for overseas shipments.

The inventors have further discovered that when sweetening gas, the addition of selected surfactants(s) to a hydrogen sulfide scavenger will typically enhance the performance of the scavenger by promoting intimate contact between the scavenger and the hydrogen sulfide in the gas. Applications where gas is sweetened through use of in-line injection, scrubbing towers, or a combination of the two benefit the most from surfactants.

When the surfactant-containing scavengers of the present invention are used in contact towers (scrubbers), the foam height within the tower may be controlled by type and amount of surfactant employed as well as the adjustment of the fluid level within the tower. In this way, carryover problems may be avoided.

All surfactants may be used in selected hydrogen scavenger applications. The surfactants may be nonionic, anionic, cationic, amphoteric, or combinations thereof. An example of a nonionic surfactant useful in combination with the present invention is the reaction product of nonylphenol and about 10 to about 12 moles of ethylene oxide.

Surfactants can be used to fine tune a formulation for application in specific circumstances, such as tower height, in-line injection, hydrogen sulfide concentration, and the like. The amount of surfactant that is added to the scavenger of the present invention may be any amount, but will typically vary from about 0.05% to about 5% by volume of the total scavenger solution depending on the particular application. The preferred surfactant concentrations are less than one percent (1.0%).

The hydrogen sulfide scavengers of the present invention can be applied in various ways. When sweetening natural gas, the scavenger can be placed into a contact (scrubber) tower, sprayed into a packed tower, injected into the well at the well-head, injected in-line before and/or after the gas/liquid separators, and/or injected upstream of in-line static mixers (with or without atomization). Multiple injection points or contacting towers may be utilized as necessary to accommodate the volume of gas and/or the hydrogen sulfide levels specified. It is also possible to use a combination of the above application techniques.

When suppressing or removing hydrogen sulfide from a liquid hydrocarbon, it is still possible to inject the scavenger upstream of an inline mixer, as well as using a contact tower. For that matter, any technique currently known in the art, or which will later be developed, for promoting intimate gas/liquid or liquid/liquid contact may be utilized with the present invention.

The following examples serve to merely illustrate specific embodiments of the invention and the best known mode of practice thereof. Accordingly, the examples are not to be considered in any respect as a limitation of the scope thereof. In the following examples, all percentages are given on a weight basis unless otherwise indicated.

EXAMPLE 3—GASEOUS HYDROCARBON EVALUATION

Several amine blend formulations of the present invention were prepared according to the one of the three following blending processes:

Regular Process:

(1) A reaction vessel was charged with 37% formaldehyde inhibited with 7% methanol and a solvent system that was either water or a blend of water and methanol; and (2) The blend of amines was added to the reaction vessel by way of a dropping funnel. The temperature of the exothermic reaction between the amine(s) and formaldehyde was controlled between 55° and 65° C. The reaction mix was stirred for one hour and then allowed to cool to ambient temperature.

Reverse Process:

(1) The reaction vessel was charged with the amine or blend of amines and the solvent system that was either water or a blend of water and methanol.

(2) The 37% formaldehyde inhibited with 7% methanol was added to the reaction vessel by way of a dropping funnel. The temperature of the exothermic reaction between the amine(s) and aldehyde(s) was controlled between 55° and 65° C. The reaction mix was stirred for one hour and then allowed to cool to ambient temperature.

Sequential Process (Used when a combination of aldehydes, such as formaldehyde and ethanedial, are used in the same formulation)

(1) The vessel was charged with water and the first aldehyde (generally ethanedial).

(2) The stoichiometric quantity of the enhancing amine was added to the reaction vessel by way of a dropping funnel. The temperature of the reaction mass was controlled between 55° and 65° C. the reaction mix was stirred until the temperature reached 40° C.

(3) The vessel was charged with 37% aqueous formaldehyde inhibited with 7% methanol.

(4) The second polyamine was added to the reaction vessel by way of a dropping funnel. The exothermic reaction was controlled between 55° and 60° C. The reaction mix was stirred for one hour and then allowed to cool to ambient temperature at which point the methanol was added.

NOTE: The order of addition may be varied, but the enhancing amine/aldehyde product must be formed first in order to avoid gel formation.

Several formulations for scavenging $H_2S$ from natural gas were evaluated on Texas Gulf Coast field gas using laboratory scale testing equipment consisting of sparger-equipped clear plastic towers 1.25 inches in diameter by 16 inch in height. The volume of influent field gas was split evenly between the towers and accurately measured with a flow control meter for each individual tower. The $H_2S$ concentration in the influent and effluent gas was measured with a SENSIDYNE/GASTEC pump and $H_2S$ analyzer tubes. (Sensidyne and Gastec are trademarks of the Sensidyne, Inc. of Clearwater, Fla.). This technique allowed the scavenging performance of the present formulations and available commercial products to be directly compared.

Because (1) the $H_2S$ concentration in the untreated gas was constant, (2) the amount of chemical that was charged to each tower (80 mi.) was the same, and (3) the gas flow rate to each tower was the same (2.0 standard cubic feet per hour), the performance of each scavenger was proportional to the length of time before the effluent gas reached or exceeded 1,000 ppm $H_2S$.

The field gas that was used in the evaluations had the following composition and properties:

| | |
|---|---|
| Methane | 92.9% |
| Ethane | 0.4% |
| Carbon Dioxide | 2.4% |
| Hydrogen Sulfide | 12,200 ppm |
| Gas pressure | 185 psig |
| Gas temperature | 130° F. |

The following tables describe the formulations tested and the amount of time before the effluent gas reached 1,000 ppm $H_2S$.

| FORMULATION 1 (Regular Manufacturing Process) | |
|---|---|
| Ingredient | Weight Percent |
| Aminoethoxyethanol | 11.84 |
| Aminoethylpiperazine | 15.02 |
| Water | 40.00 |
| Methanol | 10.43 |
| 37% Formaldehyde | 22.71 |

TEST TIME CONSUMED = 4 hours 15 minutes

| FORMULATION 2 (Regular Manufacturing Process) | |
|---|---|
| Ingredient | Weight Percent |
| Aminoethoxyethanol | 11.94 |
| Diethylenetriamine | 14.63 |
| Water | 25.90 |
| Methanol | 10.00 |
| 37% Formaldehyde | 37.63 |

TEST TIME CONSUMED = 2 hours 25 minutes

| FORMULATION 3 (Regular Manufacturing Process) | |
|---|---|
| Ingredient | Weight Percent |
| Aminoethoxyethanol | 6.48 |
| Aminoethylpiperazine | 20.11 |
| Water | 34.18 |
| Methanol | 16.16 |
| 37% Formaldehyde | 23.07 |

TEST TIME CONSUMED = 4 hours 10 minutes

| FORMULATION 4 (Regular Manufacturing Process) | |
|---|---|
| Ingredient | Weight Percent |
| Aminoethoxyethanol | 6.36 |
| Diethylenetriamine | 19.14 |
| Water | 20.08 |
| Methanol | 12.68 |
| 37% Formaldehyde | 41.74 |

TEST TIME CONSUMED = 3 hours 45 minutes

| FORMULATION 5 (Regular Manufacturing Process) | |
|---|---|
| Ingredient | Weight Percent |
| Methoxypropylamine | 5.42 |
| Aminoethylpiperazine | 20.34 |
| Water | 34.54 |
| Methanol | 16.38 |
| 37% Formaldehyde | 23.32 |

TEST TIME CONSUMED = 4 hours 5 minutes

| FORMULATION 6 (Regular Manufacturing Process) | |
|---|---|
| Ingredient | Weight Percent |
| Methoxypropylamine | 11.13 |
| Triethyleneglycoldiamine | 15.10 |
| Water | 21.25 |
| Methanol | 26.93 |
| 37% Formaldehyde | 25.59 |

TEST TIME CONSUMED = 3 hours 55 minutes

| FORMULATION 7 (Regular Manufacturing Process) | |
|---|---|
| Ingredient | Weight Percent |
| 85% Monoethanolamine | 6.98 |
| Aminoethylpiperazine | 19.27 |
| Water | 48.58 |

-continued

| FORMULATION 7 (Regular Manufacturing Process) | |
|---|---|
| Ingredient | Weight Percent |
| 37% Formaldehyde | 25.17 |

TEST TIME CONSUMED = 3 hours 45 minutes

| FORMULATION 8 (Reverse Manufacturing Process) | |
|---|---|
| Ingredient | Weight Percent |
| 85% Monoethanolamine | 6.98 |
| Aminoethylpiperazine | 19.27 |
| Water | 48.58 |
| 37% Formaldehyde | 25.17 |

TEST TIME CONSUMED = 3 hours 40 minutes

| FORMULATION 9 (Reverse Manufacturing Process) | |
|---|---|
| Ingredient | Weight Percent |
| Aminoethoxyethanol | 6.22 |
| Aminoethylpiperazine | 19.29 |
| Water | 53.37 |
| 37% Formaldehyde | 22.12 |

TEST TIME CONSUMED = 3 hours 55 minutes

| FORMULATION 10 (Reverse Manufacturing Process) | |
|---|---|
| Ingredient | Weight Percent |
| Methoxypropylamine | 5.20 |
| Aminoethylpiperazine | 19.55 |
| Water | 53.06 |
| 37% Formaldehyde | 22.19 |

TEST TIME CONSUMED = 4 hours 5 minutes

| FORMULATION 11 (Regular Manufacturing Process) | |
|---|---|
| Ingredient | Weight Percent |
| Methoxypropylamine | 5.42 |
| Aminoethylpiperazine | 20.34 |
| Methanol | 16.38 |
| Water | 34.54 |
| 37% Formaldehyde | 23.32 |

TEST TIME CONSUMED = 3 hours 35 minutes

| FORMULATION 12 (Reverse Manufacturing Process) | |
|---|---|
| Ingredient | Weight Percent |
| Methoxypropylamine | 5.42 |
| Aminoethylpiperazine | 20.34 |
| Methanol | 16.38 |
| Water | 34.54 |
| 7% Formaldehyde | 23.32 |

TEST TIME CONSUMED = 3 hours 45 minutes

| FORMULATION 13 (Regular Manufacturing Process) | |
|---|---|
| Ingredient | Weight Percent |
| Methoxypropylamine | 5.19 |
| Aminoethylpiperazine | 19.50 |
| Water | 52.95 |
| 37% Formaldehyde | 22.36 |

TEST TIME CONSUMED = 3 hours 45 minutes

| FORMULATION 14 (Reverse Manufacturing Process) | |
|---|---|
| Ingredient | Weight Percent |
| Methoxypropylamine | 5.19 |
| Aminoethylpiperazine | 19.50 |
| Water | 52.95 |
| 37% Formaldehyde | 22.36 |

TEST TIME CONSUMED = 3 hours 15 minutes

| FORMULATION 15 (Regular Manufacturing Process) | |
|---|---|
| Ingredient | Weight Percent |
| Aminoethoxyethanol | 13.25 |
| Triethyleneglycoldiamine | 14.85 |
| Methanol | 28.95 |
| Water | 17.22 |
| 37% Formaldehyde | 25.73 |

TEST TIME CONSUMED = 4 hours 5 minutes

| FORMULATION 16 (Reverse Manufacturing Process) | |
|---|---|
| Ingredient | Weight Percent |
| Methoxypropylamine | 10.39 |
| Triethyleneglycoldiamine | 14.11 |
| Water | 51.60 |
| 37% Formaldehyde | 23.90 |

TEST TIME CONSUMED = 3 hours 35 minutes

| FORMULATION 17 (Reverse Manufacturing Process) | |
|---|---|
| Ingredient | Weight Percent |
| Aminoethoxyethanol | 12.32 |
| Triethyleneglycoldiamine | 13.80 |
| Water | 50.49 |
| 37% Formaldehyde | 23.39 |

TEST TIME CONSUMED = 3 hours 30 minutes

| FORMULATION 18 (Regular Manufacturing Process) | |
|---|---|
| Ingredient | Weight Percent |
| Aminoethoxyethanol | 26.60 |
| Water | 52.63 |
| 37% Formaldehyde | 20.77 |

TEST TIME CONSUMED = 3 hours 15 minutes

| FORMULATION 19 (Reverse Manufacturing Process) | |
|---|---|
| Ingredient | Weight Percent |
| Aminoethoxyethanol | 26.60 |
| Water | 52.63 |
| 37% Formaldehyde | 20.77 |

TEST TIME CONSUMED = 3 hours 25 minutes

| FORMULATION 20 | |
|---|---|
| Ingredient | Weight Percent |
| Methoxypropylamine | 21.70 |
| Ethanedial | 35.13 |
| Water | 43.17 |

TEST TIME CONSUMED = 1 hour 45 minutes

| FORMULATION 21 | |
|---|---|
| Ingredient | Weight Percent |
| Methoxypropylamine | 5.11 |
| Aminoethylpiperazine | 19.36 |
| Ethanedial | 8.27 |
| 37% Formaldehyde | 17.22 |
| Water | 50.04 |

TEST TIME CONSUMED 3 hours 15 minutes

| FORMULATION 22 (Sequential Manufacturing Process) | | |
|---|---|---|
| Ingredient | Weight Percent | Addition Order |
| Methoxypropylamine | 8.87 | 3 |
| Ethanedial | 16.16 | 2 |
| Aminoethylpiperazine | 17.14 | 4 |
| 37% Formaldehyde | 15.15 | 5 |
| Methanol | 18.86 | 6 |
| Water | 23.82 | 1 |

TEST TIME CONSUMED = 3 hours 20 minutes

| FORMULATION 23 (Sequential Manufacturing Process) | | |
|---|---|---|
| Ingredient | Weight Percent | Addition Order |
| Methoxypropylamine | 8.87 | 2 |
| Ethanedial | 16.16 | 3 |
| Aminoethylpiperazine | 17.14 | 5 |
| 37% Formaldehyde | 15.15 | 4 |
| Methanol | 18.86 | 6 |
| Water | 23.82 | 1 |

TEST TIME CONSUMED = 3 hours 15 minutes

| FORMULATION 24 | |
|---|---|
| Ingredient | Weight Percent |
| 85% Monoethanolamine | 24.14 |
| Ethanedial | 48.84 |
| Water | 18.32 |

-continued

FORMULATION 24

| Ingredient | Weight Percent |
|---|---|
| Methanol | 8.70 |

TEST TIME CONSUMED = 1 hour 20 minutes

FORMULATION 25

| Ingredient | Weight Percent |
|---|---|
| Aminoethoxyethanol | 26.12 |
| Ethanedial | 35.36 |
| Water | 23.47 |
| Methanol | 15.05 |

TEST TIME CONSUMED = 3 hours 45 minutes

FORMULATION 26

| Ingredient | Weight Percent |
|---|---|
| Aminoethylethanolamine | 24.68 |
| Ethanedial | 51.31 |
| Water | 9.40 |
| Methanol | 14.61 |

TEST TIME CONSUMED = 1 hour 25 minutes

FORMULATION 27

| Ingredient | Weight Percent |
|---|---|
| Aminoethoxyethanol | 9.85 |
| Ethylenediamine | 12.47 |
| Ethanedial | 72.08 |
| Methanol | 5.60 |

TEST TIME CONSUMED = 1 hour 15 minutes

FORMULATION 28A (Sequential Manufacturing Process)

| Ingredient | Weight Percent | Addition Order |
|---|---|---|
| Aminoethoxyethanol | 10.44 | 3 |
| Ethanedial | 14.17 | 2 |
| Aminoethylpiperazine | 19.57 | 4 |
| 37% Formaldehyde | 17.41 | 5 |
| Methanol | 16.10 | 6 |
| Water | 22.32 | 1 |

TEST TIME CONSUMED = 4 hours 15 minutes

FORMULATION 28B (Sequential Manufacturing Process)

| Ingredient | Weight Percent | Addition Order |
|---|---|---|
| Aminoethoxyethanol | 10.44 | 3 |
| Ethanedial | 14.17 | 2 |
| Aminoethylpiperazine | 19.57 | 5 |
| 37% Formaldehyde | 17.41 | 4 |
| Methanol | 16.10 | 6 |
| Water | 22.32 | 1 |

TEST TIME CONSUMED = 4 hours 10 minutes

FORMULATION 29 (Sequential Manufacturing Process)

| Ingredient | Weight Percent | Addition Order |
|---|---|---|
| 85% Monoethanolamine | 9.98 | 3 |
| Ethanedial | 20.24 | 2 |
| Aminoethylpiperazine | 19.50 | 5 |
| 37% Formaldehyde | 17.35 | 4 |
| Methanol | 13.24 | 6 |
| Water | 19.69 | 1 |

TEST TIME CONSUMED = 3 hours 10 minutes

FORMULATION 30 (Sequential Manufacturing Process)

| Ingredient | Weight Percent | Addition Order |
|---|---|---|
| Aminoethylethanolamine | 10.02 | 3 |
| Ethanedial | 20.90 | 2 |
| Aminoethylpiperazine | 19.31 | 5 |
| 37% Formaldehyde | 17.17 | 4 |
| Methanol | 13.11 | 6 |
| Water | 19.49 | 1 |

TEST TIME CONSUMED = 3 hours 25 minutes

FORMULATION 31

| Ingredient | Weight Percent |
|---|---|
| Aminoethoxyethanol | 10.08 |
| Ethanedial | 38.15 |
| Aminoethylpiperazine | 15.11 |
| Methanol | 15.11 |
| Water | 21.55 |

TEST TIME CONSUMED = 1 hour 15 minutes

FORMULATION 32

| Ingredient | Weight Percent |
|---|---|
| Methoxypropylamine | 8.48 |
| Ethanedial | 38.76 |
| Aminoethylpiperazine | 15.40 |
| Methanol | 15.40 |
| Water | 21.96 |

TEST TIME CONSUMED = 1 hour 15 minutes

When attempts were made to make the following formulations without using a modifier, or enhancing amine, a gelatinous precipitate formed before a stoichiometrically balanced amount of the amine was added to the water, methanol, formaldehyde mix. Reversing the order of addition produced similar results.

FORMULATION 33

| Ingredient | Weight Percent |
| --- | --- |
| Diethylenetriamine | 25.76 |
| Methanol | 49.60 |
| 37% Formaldehyde | 24.64 |

FORMULATION 34

| Ingredient | Weight Percent |
| --- | --- |
| Triethyleneglycoldiamine | 27.33 |
| Water | 19.02 |
| Methanol | 24.60 |
| 37% Formaldehyde | 29.05 |

FORMULATION 35

| Ingredient | Weight Percent |
| --- | --- |
| Aminoethylpiperazine | 26.26 |
| Water | 33.95 |
| Methanol | 16.26 |
| 37% Formaldehyde | 23.53 |

FORMULATION 36

| Ingredient | Weight Percent |
| --- | --- |
| Triethylenetetramine | 26.07 |
| Water | 10.30 |
| Methanol | 21.09 |
| 37% Formaldehyde | 42.54 |

In formulations 20–32, the ratio of active hydrogen in the enhancing amine to the carbonyl equivalents in the ethanedial was 1:1, rather than the preferred ratio of 2:1.

EXAMPLE 4—LIQUID HYDROCARBON EVALUATION

The effectiveness of Formulation 3 from Example 1 for removing hydrogen sulfide from liquid hydrocarbons was tested. A container of 6,000 gallons of 20 API gravity (7.778 lbs/gal), South Texas sour crude oil containing 1200 ppm $H_2S$ was treated with 7.0 gallons of Formulation 3.

The scavenger was injected into the suction side of a circulation pump by way of a quill and circulated until the $H_2S$ concentration stabilized. The hydrogen sulfide concentration was reduced to 280 ppm. Formulation 3 removed 6.13 lbs. of $H_2S$ per gallon of the formulation.

EXAMPLE 5—AQUEOUS SYSTEMS

Water from an oil field waterflood was obtained from Southern Oklahoma which contained 40 ppm $H_2S$. This level of $H_2S$ was causing corrosion and iron sulfide deposition in the processing equipment. A sample of the water was combined in a bottle with an equal amount of the scavenger of Formulation 1. After shaking the bottle, the $H_2S$ concentration was again measured. The results showed 1 ppm of $H_2S$ was removed for every 1.35 ppm of scavenger consumed.

EXAMPLE 6—SURFACTANTS

During a field test on wet associated gas in a Southern Oklahoma oil field, 300 mscfd of gas was treated containing 8,000 ppm $H_2S$. The test apparatus consisted of a 1.25 inch diameter by 16 inch tall clear plastic scrubbing tower. A flow meter controlled the gas flow at 1.50 standard cubic feet per hour.

The treating chemical contained 0.25% by volume of the reaction product of nonylphenol and about 10 to about 12 moles of ethylene oxide. The scrubbing tower was charged with 80 ml of the treating chemical containing the surfactant. During the treating process, a quick breaking foam column formed above the scavenging chemical, but well below the top of the tower. There was no carryover and the effluent gas test reflected no $H_2S$ (0 ppm) for three (3) hours while the foam column above the treating chemical was intact.

When a defoamer was used to temporarily knock down the foam, the concentration of $H_2S$ in the effluent gas jumped from 0 ppm to 11 ppm and never went back down to 0 ppm since the foam did not regain its original height during the remainder of the test.

While the foregoing is directed to the preferred embodiment of the present invention, other and further embodiments of the invention may be devised without departing from the basic scope thereof which is determined by the claims that follow.

What is claimed is:

1. A method for selectively reducing the levels of hydrogen sulfide and organic sulfides present in a gas, a liquid, or a mixture thereof, comprising the step of contracting the sulfides with a composition consisting essentially of the reaction mixture formed from the reaction between;

(a) a dialdehyde having two carbonyl groups; and (b) an alkanolamine having at least one hydrogen atom bonded directly to a nitrogen atom, wherein the amounts of dialdehyde and alkanolamine provide between about 1.5 and about 3 equivalents of hydrogen atoms bonded directly to a nitrogen atom in the alkanolamine for every equivalent of carbonyl groups in the dialdehyde, and wherein the reaction mixture is substantially free of triazines.

2. The method of claim 1 wherein the dialdehyde is ethanedial.

3. The method of claim 1 wherein the composition further comprises a surfactant.

4. The method of claim 1 wherein the alkanolamine is selected from the group consisting of aminoethylethanolamine, monoethanolamine, isopropanolamine, 2-amino-1-butanol, 2-amino-2-methyl-1-propanol, 2-amino-2-methyl-1,3-propanediol, 2-amino-2-ethyl-1,3-propanediol, tris(hydroxymethyl)aminomethane, and mixtures thereof.

5. The method of claim 1 wherein the alkanolamine is monoethanolamine.

6. The method of claim 1 wherein the amounts of dialdehyde and alkanolamine provide about 2 equivalents of hydrogen atoms bonded directly to a nitrogen atom in the alkanolamine for every equivalent of carbonyl groups in the dialdehyde.

7. The method of claim 1 wherein the alkanolamine is monoethanolamine and the dialdehyde is ethanedial, wherein the composition reacts with the sulfide to form a waste product characterized in that substantially no solids are present 8. The method of claim 1 wherein the reaction between the dialdehyde and the alkanolamine takes place at a temperature less than about 150° F.

9. The method of claim 8 wherein the dialdehyde is an aqueous solution comprising about 40 percent ethanedial in water.

10. A method for selectively reducing the levels of hydrogen sulfide and organic sulfides present in a gas, comprising the step of contacting the sulfides with a composition consisting essential of the reaction mixture formed from the reaction between:

(a) ethanedial having two carbonyl groups; and (b) monoethanolamine having two hydrogen atoms bonded directly to a nitrogen atom, wherein the amounts of ethanedial and monoethanolamine provide about 2 equivalents of hydrogen atoms bonded directly to a nitrogen atom in the monoethanolamine for every equivalent of carbonyl groups in the ethanedial, and wherein the reaction mixture is substantial free of triazines.

11. The method of claim 10 wherein the reaction between the dialdehyde and the alkanolamine takes place at a temperature less than about 150° F.

* * * * *